United States Patent [19]

Oestreich et al.

[11] 4,312,565
[45] Jan. 26, 1982

[54] GAS PRESSURE TIGHT OPTICAL CABLES

[75] Inventors: Ulrich Oestreich, Munich; Guenter Zeidler, Unterpfaffenhofen, both of Fed. Rep. of Germany

[73] Assignee: Siemens Aktiengesellschaft, Berlin & Munich, Fed. Rep. of Germany

[21] Appl. No.: 65,962

[22] Filed: Aug. 13, 1979

[30] Foreign Application Priority Data

Oct. 30, 1978 [DE] Fed. Rep. of Germany ....... 2847382

[51] Int. Cl.³ .................... G02B 5/16; H02G 15/20
[52] U.S. Cl. .................... 350/96.23; 174/23 R
[58] Field of Search ............. 350/96.23, 96.26; 174/120 R, 120 SR, 121 R, 121 SR, 23 R

[56] References Cited

U.S. PATENT DOCUMENTS

| 2,004,004 | 6/1935 | Knoderer | 174/120 R |
|---|---|---|---|
| 2,795,640 | 6/1957 | Crandall | 174/120 R |
| 3,539,409 | 11/1970 | Stone | 174/120 R |
| 4,072,400 | 2/1978 | Claypoole | |
| 4,076,382 | 2/1978 | Oestreich | |

FOREIGN PATENT DOCUMENTS

| 2302662 | 7/1974 | Fed. Rep. of Germany . | |
|---|---|---|---|
| 2429670 | 1/1975 | Fed. Rep. of Germany . | |
| 2551211 | 5/1977 | Fed. Rep. of Germany . | |
| 2628069 | 8/1977 | Fed. Rep. of Germany . | |
| 1445732 | 8/1976 | United Kingdom . | |
| 1481582 | 8/1977 | United Kingdom | 350/96.23 |

*Primary Examiner*—John K. Corbin
*Assistant Examiner*—Rodney B. Bovernick
*Attorney, Agent, or Firm*—Hill, Van Santen, Steadman, Chiara & Simpson

[57] ABSTRACT

An optical communication cable structure having a longitudinally gas-impermeable cable core surrounded by an inner sheath, an intermediate layer and an outer sheath with the intermediate layer being bonded to the inner and outer sheath. The intermediate layer is comprised of a simple or crossed spinning of yarn, such as an aramide yarn, which is wound about the cable core with a given length of lay approximately corresponding to the diameter of the cable core and at select spaced apart cable length intervals the yarn is wound with a substantially shortened length of web lay relative to the given length of cable lay, to define space-free pressure windings compressing the core at such select intervals. With this type of an arrangement, inflation of the inner sheath and occurrence of longitudinal gas channels extending along the length of the cable core is avoided.

10 Claims, 1 Drawing Figure

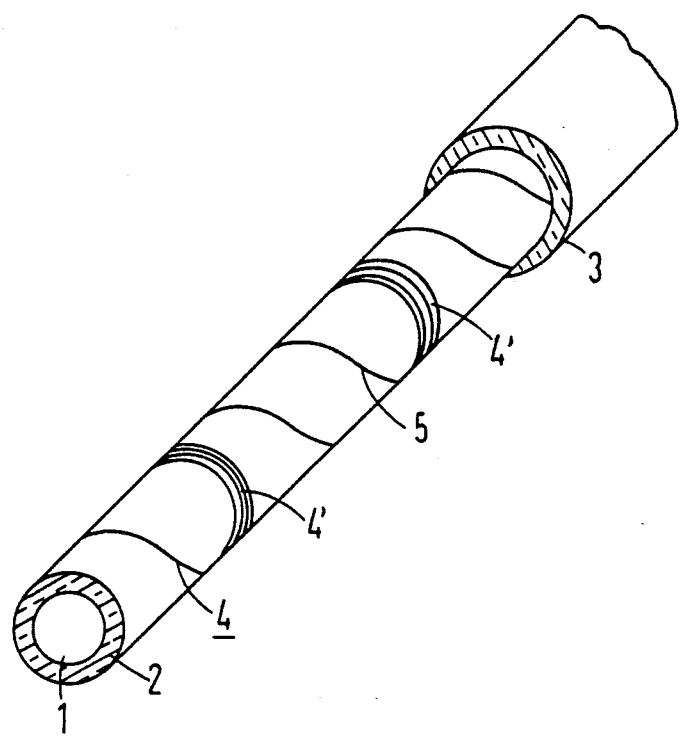

GAS PRESSURE TIGHT OPTICAL CABLES

BACKGROUND OF THE INVENTION

1. Field of the Invention

The invention relates to optical communication cables and somewhat more particularly to optical communication cable structures useful in pressurized environments.

2. Prior Art

Optical communication cable structures are known and in such cable structures, the cable sheath functions to protect optical leads therein, which for example are comprised of glass fibers. In certain known optical cable structures, a given plurality of optical leads or elements are loosely stranded to form bundles and such bundles are stranded with one another to form a cable core which is enveloped by a protective sheath consisting of an inner sheath, a metal foil encasing the inner sheath and an outer sheath about the metal foil. The metal foil forms a vapor-barrier for the cable core, which can be provided with a jelly-like lubricant (see German OS No. 2,302,662 which generally corresponds to U.S. Pat. No. 4,072,398). In another known cable structures, optical leads are stranded around a tension-releaving element and hollow spaces within the resultant cable core are filled with a petrolatum-like material and enveloped with a polyethylene sheath. The petrolatum-like material improves the friction ratio between the various elements of the cable structure and provides longitudinal moisture-impermeability (see German OS No. 2,429,670, which generally corresponds to British Patent Specification No. 1,455,732).

In order to further improve the mechanical protection provided by a cable sheath in optical cable structures, it is known to form an inner cable sheath of thermoplastic polyurethane and to form an outer sheath of polyvinyl chloride or a polyvinyl chloride/urethane mixture and to provide a web of threads or rovings composed of an aromatic polyamide (i.e., comprised of synthetic threads having a greater tensile strength than optical elements) between both the inner and outer sheath as well as between the inner sheath and a cable core (for example see German OS No. 2,551,211, which approximately corresponds to U.S. Pat. No. 4,076,382, or German AS No. 2,628,069).

Optical communication cables are utilized in various environments, for example in transmitting select light signals from within high voltage systems or spaces which are charged with a pressurized gas, such as in nuclear reactors. In such pressurized environments, optical communication cable structures must be substantially gas-impermeable.

SUMMARY OF THE INVENTION

In accordance with the principles of the invention, an optical communication cable structure is provided which has a longitudinally gas-impermeable cable core surrounded by a synthetic inner sheath, an intermediate layer and an outer synthetic sheath, with the intermediate layer being comprised of a spinning of synthetic yarn which is wound about the cable core with a given length of lay that is approximately equal to the cable core diameter and at intervals along the cable core the yarn is wound with substantially shorter lengths of lay relative to the given length of lay so as defined space-free pressure windings compressing the core at such intervals. With this type of an arrangement, inflation of the inner sheath and occurrence of gas channels extending in the longitudinal direction of the cable core are substantially avoided.

In accordance with the principles of the invention, the intermediate layer is composed of a simple or cross-spun lay of yarn having a given width and which is wound about a cable core with a given length of lay approximately equal to the diameter of cable core, and at select cable length intervals the yarn is wound about the cable core with a substantially shortened length of lay relative to the given length of lay to define space-free pressure windings compressing the core at such select intervals. With this type of cable sheath construction, a pressurized gas at an end of an optical cable is prevented from inflating the synthetic sheath about the cable core and the formation of uninterrupted gas channels extending in the longitudinal direction between the cable core and cable sheath is avoided. By providing space-free pressure windings at select intervals along a cable core length, the inventive structure substantial guarantees that any gas channels which may form adjacent the cable core and extent longitudinal there along are interrupted at such pressure windings. In certain embodiments of the invention, an adhesive sealing compound is provided at least between the cable core and such intermediate layer so as to achieve an improved seal between the cable core and the surrounding sheath structure. Such sealing compounds are elastic and sticky at operating temperatures of an optical cable. A particularly useful sealing compound is a cross-linked mass based on a polyether-polyester-polyol or a polyester-polyol mixture formed of a relatively low viscosity, branched, long-chained, aliphatic, mono-functional alcohol and a low viscosity monomeric aralkyl-diisocyanate, further details of which are disclosed in co-pending application U.S. Ser. No. 065,961 filed Aug. 13, 1979, abandoned, and now continuation-in-part application Ser. Nos. 212,230 and 212,231, respectively filed on Dec. 2, 1980, with is incorporated herein by reference.

The pressure windings of the invention are preferably formed from a web of yarn composed of synthetic thread having substantial tensile strength and which is preferably bonded to inner and outer sheaths of the cable core. In accordance with preferred embodiments of the invention, such pressure windings are provided so as to have a width of about 5 to 10 mm and are spaced from one another a distance ranging between about 100 to 500 mm along a cable length.

BRIEF DESCRIPTION OF THE DRAWINGS

The Figure is a somewhat schematic, partially broken away, isometric view of an optical communication cable structure constructed in accordance with the principles of the invention.

DESCRIPTION OF THE PREFERRED EMBODIMENTS

The invention provides an optical communication cable structure that is substantially gas-impermeable at least in the longitudinal dimension thereof.

In accordance with the principles of the invention, an optical communication cable is comprised of longitudinally extending, substantially gas-impermeable cable core having optical elements therein, an inner sheath surrounding such cable core, an intermediate layer about the inner sheath and an outer sheath surrounding the intermediate layer, with the intermediate layer being comprised of a woven web of yarn having a given width and being wound about the cable core with a given length of web lay approximately equal to the diameter of the cable core, and at select cable intervals such yarn is wound about the cable core with a substantially shortened length of lay relative to said length of lay to define space-free pressure windings compressing the core at such select intervals.

In certain embodiments of the invention, the spinning is formed of a yarn consisting of a synthetic thread having substantial tensile strength and which is, preferably, adhered or bonded to the inner and outer sheaths of a cable structure of the invention. In certain embodiments of the invention, the pressure windings have a width ranging from about 5 to 10 mm. In certain embodiments of the invention, the pressure windings are spaced apart a distance along the length of a cable core ranging between about 100 through 500 mm.

In certain embodiments of the invention the inner and outer sheaths of the cable structure are composed of a rubber-like material based on polyurethane. In certain embodiments of the invention the yarn of the intermediate layer is a aramide yarn which is saturated with a soluble polyurethane or with an adhesive which adheres to polyurethane upon the application of heat. In certain embodiments of the invention, the inner sheath, the intermediate web layer and the outer sheat are bonded to one another in a substantially gas-impermeable and space-free manner.

In certain preferred embodiments of the invention, hollow spaces in a cable core are filed with an elastic sticky mass of material having a composition based on a polyetherpolyester-polyol or on a polyester-polyol mixture comprised of a relatively low viscosity, crosslinked, long-chained, aliphatic, mono-functional alcohol and a low viscosity monmeric aralkyl-diisocyanate.

In accordance with the principles of the invention, the production of pressure bands or winding from a spiral-shaped spun synthetic yarn assures that a connection or bonding between the inner and outer sheaths occurs at spaced apart intervals along the length of the cable core between two sealing areas or pressure bands. In this manner, no new gas leakages can occur along the length of the cable core between two sealing areas. Such pressure bands are effective when the synthetic yarn is composed of a thread material having substantial tensil strength and is saturated with a soluble synthetic which reacts with the synthetic material forming the inner and outer sheath or with an adhesive which adheres to the material of the inner and outer sheath upon the application of heat. In this manner a tight seal is formed between the inner sheath, the intermediate layer formed of such spinning and an outer sheath upon application of the outer sheath, for example, via extrusion casting.

Preferably, the inner and outer sheath are comprised of a rubber-like material based on polyurethane. In such preferred embodiments, the synthetic thread of the intermediate web is preferably saturated with a soluble polyurethane or an adhesive which adheres to polyurethane upon the application of heat. A preferred synthetic yarn having adequate tensile strength for use in the practice of the invention is an aramide yarn (for example available under the trade name Kevlar).

Referring now to the drawing, a longitudinally extending substantially gas-impermeable cable core 1 is illustrated. The cable core is comprised of a plurality of optical leads, tension-relieving elements, electrically-conductive elements and other like elements conventionally present in optical communication cables (none of which are shown in the drawing for sake of simplicity). Such cable core is rendered gas-impermeable by the inclusion of a jelly-like mass between the various elements thereof. An inner sheath 2, for example composed of a polyurethane, and an outer sheath 3, for example, likewise composed of a polyurethane, are positioned about the cable core. A spinning 4 consisting of an aramide yarn is positioned between the inner sheath 2 and the outer sheath 3. The yarn is wound about the cable core in such a manner that a space-free pressure windings 4' are attained at select intervals and the aramide yarn 5 is spun on or wound on between such intervals with a length of lay approximately corresponding to the core diameter.

As utilized herein, a length of lay is defined as a distance or advance made by any point in a spinning of yarn as such yarn is wound a turn about a cylindrical body, for example an optical core.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims. The discontinuous spinning of the yarn can be provided by periodical modulations of the pull-off speed.

We claim as our invention:

1. An optical communication cable comprised of:
a longitudinally extending, substantially gas-impermeable cable core having optical elements therein;
an inner sheath surrounding said cable core;
an intermediate layer about said inner sheath; and
an outer sheath surrounding said intermediate layer;
said intermediate layer being comprised of a spinning of yarn having a given width and being wound about said cable core with a given length of lay approximately equal to the diameter of said cable core and at select cable length intervals said yarn being wound about said cable core with a substantially shortened length of lay, relative to said given length of lay, to define space-free pressure windings compressing said core at such select intervals.

2. An optical communication cable as defined in claim 1 wherein said spinning of yarn is composed of saturated synthetic threads having a substantial tensile strength and said spinning is bonded to said inner and outer sheath.

3. An optical communication cable as defined in claim 1 wherein the pressure windings have a width of about 5 to 10 mm.

4. An optical communication cable as defined in claim 3 wherein the select intervals between adjacent pressure windings along a cable length is about 100 to 500 mm.

5. An optical communication cable as defined in claim 1 wherein the inner and outer sheath are composed of a rubber-like material based on polyurethane.

6. An optical communication cable as defined in claim 5 wherein the spinning of yarn is composed of an aramide yarn which is saturated with a soluble polyurethane.

7. An optical communication cable as defined in claim 5 wherein said spinning of yarn is composed of an aramide yarn saturated with an adhesive which adheres to polyurethane upon application of heat.

8. An optical communication cable as defined in claim 1 wherein said inner sheath, intermediate layer and an outer sheath are bonded to one another in an essentially space-free manner.

9. An optical communication cable as defined in claim 1 wherein any hollow spaces in the cable core are filled with a sticky elastomeric mass.

10. An optical communication cable as defined in claim 9 wherein said elastomeric sticky mass is based on a material selected from the group consisting of polyetherpolyester-polyol and a polyester-polyol mixture composed of a relatively low viscosity cross-linked, long-chained, aliphatic, mono-functional alcohol and a relatively low viscosity monomeric aralkyl-diisocyanate.

* * * * *